US012738075B2

(12) United States Patent
Hassan et al.

(10) Patent No.: US 12,738,075 B2
(45) Date of Patent: Sep. 15, 2026

(54) CAMERA INITIALIZATION FOR LANE DETECTION AND DISTANCE ESTIMATION USING SINGLE-VIEW GEOMETRY

(71) Applicant: MOTIVE TECHNOLOGIES, INC., San Francisco, CA (US)

(72) Inventors: Ali Hassan, Lahore (PK); Ahmed Ali, Lahore (PK); Syed Wajahat Ali Shah Kazmi, Lahore (PK)

(73) Assignee: MOTIVE TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 18/933,273

(22) Filed: Oct. 31, 2024

(65) Prior Publication Data

US 2025/0054320 A1 Feb. 13, 2025

Related U.S. Application Data

(63) Continuation of application No. 18/527,226, filed on Dec. 1, 2023, now Pat. No. 12,136,276, which is a continuation of application No. 17/493,011, filed on Oct. 4, 2021, now Pat. No. 11,875,580.

(51) Int. Cl.

| | |
|---|---|
| ***B60R 1/00*** | (2022.01) |
| ***G06F 18/214*** | (2023.01) |
| ***G06N 3/044*** | (2023.01) |
| ***G06T 7/50*** | (2017.01) |
| ***G06T 7/73*** | (2017.01) |
| ***G06T 7/80*** | (2017.01) |

(Continued)

(52) U.S. Cl.

CPC .......... *G06V 20/588* (2022.01); *G06F 18/214* (2023.01); *G06N 3/044* (2023.01); *G06T 7/50* (2017.01); *G06T 7/75* (2017.01); *G06T 2207/30256* (2013.01)

(58) Field of Classification Search

CPC .... G06V 20/588; G06V 10/82; G06F 18/214; G06N 3/044; G06N 3/0442; G06N 3/045; G06N 3/0464; G06N 3/084; G06N 3/09; G06T 7/50; G06T 7/75; G06T 2207/30256

See application file for complete search history.

(56) References Cited

U.S. PATENT DOCUMENTS

| | | | | |
|---|---|---|---|---|
| 9,805,601 | B1 * | 10/2017 | Fields | G06F 18/214 |
| 10,867,217 | B1 * | 12/2020 | Madden | G06V 10/764 |
| 11,205,284 | B2 * | 12/2021 | Dai | G06T 7/80 |

(Continued)

OTHER PUBLICATIONS

Kahn et al., "Lane detection using lane boundary marker network with road geometry constraints," pp. 1834-1843 (2020).

(Continued)

*Primary Examiner* — Howard D Brown, Jr.

(74) *Attorney, Agent, or Firm* — George David Zalepa; Greenberg Traurig, LLP

(57) ABSTRACT

Disclosed are methods, devices, and computer-readable media for detecting lanes and objects in image frames of a monocular camera. In one embodiment, a method is disclosed comprising receiving a plurality of images; identifying a horizon in the plurality of images by inputting the plurality of images into a deep learning (DL) model (either stored on a local device or via a network call); determining one or more camera parameters based on the horizon; and storing or using the camera parameters to initialize a camera.

18 Claims, 10 Drawing Sheets

(51) Int. Cl.
*G06V 20/56* (2022.01)
*H04N 5/232* (2006.01)

(56) References Cited

U.S. PATENT DOCUMENTS

| | | | | |
|---|---|---|---|---|
| 2006/0061008 | A1* | 3/2006 | Karner | G09G 5/026 264/250 |
| 2006/0164230 | A1* | 7/2006 | DeWind | B60K 35/81 340/461 |
| 2014/0063252 | A1* | 3/2014 | Zhao | H04N 17/002 348/148 |
| 2015/0177370 | A1* | 6/2015 | Trummer | G01S 7/51 356/5.01 |
| 2017/0177951 | A1 | 6/2017 | Yang et al. | |
| 2018/0046867 | A1 | 2/2018 | Yang | |
| 2018/0056871 | A1* | 3/2018 | Karner | B60R 1/12 |
| 2018/0262678 | A1* | 9/2018 | Hunt | H04N 23/72 |
| 2018/0341813 | A1* | 11/2018 | Chen | G06V 20/46 |
| 2019/0009166 | A1 | 1/2019 | Brauch | |
| 2019/0034740 | A1* | 1/2019 | Kwant | G06V 10/462 |
| 2019/0045207 | A1* | 2/2019 | Chen | G06F 21/44 |
| 2019/0102674 | A1* | 4/2019 | Kwant | G06N 20/00 |
| 2019/0205667 | A1 | 7/2019 | Avidan et al. | |
| 2019/0294889 | A1* | 9/2019 | Sriram | G06V 20/54 |
| 2020/0207358 | A1* | 7/2020 | Katz | G06V 20/56 |
| 2020/0357138 | A1* | 11/2020 | Xiang | H04N 23/54 |
| 2021/0009166 | A1 | 1/2021 | Li et al. | |
| 2021/0042530 | A1 | 2/2021 | Kim et al. | |
| 2021/0049780 | A1 | 2/2021 | Westmacot et al. | |
| 2022/0105947 | A1* | 4/2022 | Postnikov | B60W 40/076 |
| 2023/0106961 | A1 | 4/2023 | Hassan et al. | |

OTHER PUBLICATIONS

Ahmed et al., “Real-time vehicle distance estimation using single view geometry,” pp. 1100-1109 (2020).

Extended European Search Report to corresponding EP Appln. No. 22879114.1 mailed Jul. 15, 2025, 6 pages.

International Search Report and Written Opinion to corresponding International Application No. PCT/US22/45131 mailed Jan. 31, 2023 (9 pages).

* cited by examiner

CAMERA INITIALIZATION FOR LANE DETECTION AND DISTANCE ESTIMATION USING SINGLE-VIEW GEOMETRY

CROSS-REFERENCE TO RELATED APPLICATION

This application is a continuation of, and claims the benefit of, U.S. application Ser. No. 18/527,226, filed Dec. 1, 2023, which is a continuation of, and claims the benefit of, U.S. application Ser. No. 17/493,011, now U.S. Pat. No. 11,875,580, filed Oct. 4, 2021 and incorporated by reference in their entirety.

BACKGROUND

The disclosed embodiments relate to automotive systems and to machine learning systems for analyzing sensor data in such systems.

Multiple cameras or sensors may be installed in a vehicle to detect objects. However, the use of multiple cameras may be expensive. Sensors such as Radar and Lidar may also be used as proximity sensors, but such sensors may also be costly. In addition, a built-in monocular camera may be used to detect the relative distance to proximate objects; however, this may require the location of the camera to be predefined or preset.

BRIEF SUMMARY

The present disclosure relates to using a monocular camera (e.g., an image sensor) that may be retrofitted and adjustable within the vehicle such as, the vehicle's dashboard. Upon driving, the camera initializes itself to determine its height with respect to the ground as well as a road plane normal. Thus, the camera may be installed in various positions and later re-initialized or recalibrated as needed.

The example embodiments are directed towards initializing such a camera onboard a vehicle. In the various embodiments, parameters can include the height of the camera, the viewing angle of the camera relative to the roadway, and a ground or road plane normal vector. Various embodiments are illustrated for performing this initialization which can then be used by downstream processes such as distance estimation or lane boundary detection.

In a first embodiment, a network-based initialization system is disclosed. In this embodiment, a server-side system receives a video comprising a set of image frames and identifies one or more lines in the video using a predictive model (e.g., a convolutional neural network). In one embodiment, the lines can include a horizon line. After identifying the horizon line, the system computes some camera parameters (e.g., height, viewing angle, road plane normal, etc.) based on the horizon line. The system then overlays the computed horizon line on the video and transmits it to an annotator device for manual review. In response, the annotator device can transmit a confirmation indicating the horizon line was accurate. In some embodiments, the annotator device can reject the horizon line and manually add the horizon line. Once the horizon line is confirmed, the system returns the camera parameters to the calling party (e.g., a camera onboard a vehicle).

In a second embodiment, an on-vehicle neural network is disclosed. In this embodiment, a camera records a video comprising one or more image frames. A backbone network generates a set of intermediate features representing the video. The intermediate features are then input into a lane or horizon prediction head (e.g., a neural network). The lane or horizon prediction head can then predict a horizon line using the lane or horizon prediction head, the horizon line comprising a set of horizon markers. Finally, the on-vehicle device can compute a camera parameter (e.g., height, viewing angle, road plane normal, etc.) based on the horizon line and lane key points.

In a third embodiment, an on-vehicle neural network is disclosed. In this embodiment, a camera records a video comprising one or more image frames. A backbone network generates a set of intermediate features representing the video. The intermediate features are then input into a camera parameter estimation head (e.g., a neural network). The on-vehicle device can then predict camera parameters using the output of the camera parameter estimation head, the camera parameter estimation head trained using an output of the backbone network, and an output of a lane and horizon line prediction head.

Various further embodiments are disclosed in the following description.

DETAILED DESCRIPTION

Figure 1:
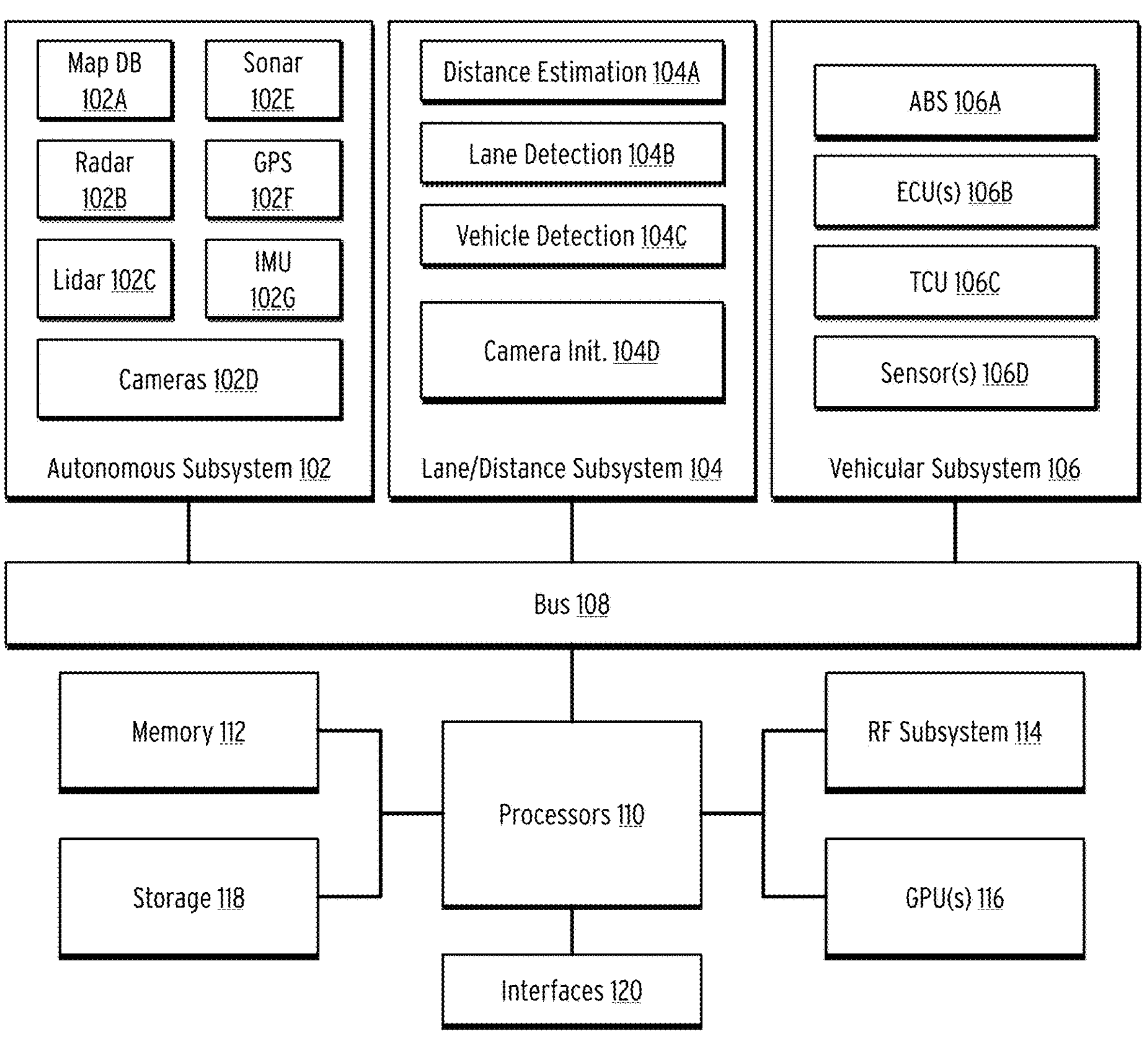
FIG. 1 is a block diagram of a vehicle according to some embodiments of the disclosure.

FIG. 1 is a block diagram of a vehicle according to some embodiments of the disclosure.

The system illustrated in FIG. 1 may be installed entirely within a vehicle. In some embodiments, some components may comprise existing autonomous vehicle subsystems, although, in some embodiments, autonomous vehicle subsystems are optional. Thus, the vehicle in FIG. 1 may comprise either an autonomous, semi-autonomous, or non-autonomous vehicle. Descriptions made herein are primarily described with respect to autonomous vehicles; however, this is not intended to be limiting.

In the illustrated embodiment, the system includes an autonomous vehicle subsystem 102 or Advanced Driver Assistance System (ADAS). In an embodiment, autonomous vehicle subsystem 102 includes map database 102A, radar devices 102B, Lidar devices 102C, digital cameras 102D, sonar devices 102E, global positioning system (GPS) receivers 102F, and inertial measurement unit (IMU) devices 102G. Each of the components of autonomous vehicle subsystem 102 comprises standard components provided in most current autonomous vehicles or ADAS. In an embodiment, map database 102A stores a plurality of high-definition three-dimensional maps used for routing and navigation. Radar devices 102B, Lidar devices 102C, digital cameras 102D, sonar devices 102E, GPS receivers 102F, and IMU devices 102G may comprise various respective devices installed at various positions throughout the autonomous vehicle as known in the art. For example, these devices may be installed along the perimeter of an autonomous vehicle to provide location awareness, collision avoidance, and another standard autonomous vehicle or ADAS functionality. As discussed, in some embodiments, the autonomous vehicle subsystem 102 may be optional or limited such as any form of an ADAS. For example, a non-autonomous vehicle may only include one camera device, such as a dash-mounted camera device. In this embodiment, the camera may be included in the sensors 106D.

Vehicular subsystem 106 is additionally included within the system. Vehicular subsystem 106 includes various anti-lock braking system (ABS) devices 106A, engine control unit (ECU) devices 106B, transmission control unit (TCU) devices 106C, and various other sensors 106D such as heat/humidity sensors, emissions sensors, etc. These components may be utilized to control the operation of the vehicle. In some embodiments, these components perform operations in response to the streaming data generated by autonomous vehicle subsystem 102. The standard autonomous vehicle interactions between autonomous vehicle subsystem 102 and vehicular subsystem 106 are generally known in the art and are not described in detail herein.

The processing side of the system includes one or more processors 110, short-term memory 112, a radio frequency (RF) system 114, graphics processing units (GPUs) 116, long-term storage 118, and one or more interfaces 120.

One or more processors 110 may comprise central processing units, field-programmable gate array (FPGA) devices, or any range of processing devices needed to support the operations of the autonomous vehicle. Memory 112 comprises dynamic random-access memory (DRAM) or other suitable volatile memory for the temporary storage of data required by processors 110. RF system 114 may comprise a cellular transceiver and/or satellite transceiver. Long-term storage 118 may comprise one or more high-capacity solid-state drives (SSDs). In general, long-term storage 118 may be utilized to store, for example, high-definition maps, routing data, and any other data requiring permanent or semi-permanent storage. GPUs 116 may comprise one or more high throughput GPU, vector processing unit (VPU), and/or tensor processing unit (TPU) devices for processing data received from autonomous vehicle subsystem 102. Finally, interfaces 120 may comprise various display units positioned within the autonomous vehicle (e.g., an in-dash screen).

Each of the devices is connected via a bus 108. In an embodiment, bus 108 may comprise a controller area network (CAN) bus. In some embodiments, other bus types may be used (e.g., a FlexRay or Media Oriented Systems Transport, MOST, bus). Additionally, each subsystem may include one or more additional busses to handle internal subsystem communications (e.g., Local Interconnect Network, LIN, busses for lower bandwidth communications).

The system additionally includes a lane and distance subsystem 104, which performs the operations required by the methods illustrated in the following figures. The lane and distance subsystem 104 includes a distance estimation subunit 104A that can determine the distance between the system and other objects. The lane and distance subsystem 104 additionally includes a lane detection subunit 104B that can detect lanes (including unmarked lanes) on a roadway the vehicle is operating on. The lane and distance subsystem 104 additionally includes a vehicle detection subunit 104C that can detect vehicles within image frames of a roadway the vehicle is operating on, as described in more detail herein.

In some embodiments, the lane and distance subsystem 104 may be an after-market device installed in a non-autonomous vehicle system. In other embodiments, the lane and distance subsystem 104 can be integrated into an autonomous vehicle's or ADAS processing units. Details of distance estimation subunit 104A, lane detection subunit 104B, and vehicle detection subunit 104C (and their operations) are further described herein. The lane and distance subsystem 104 additionally includes a camera initialization subunit 104D. In an embodiment, camera initialization subunit 104D can initialize a camera upon startup or upon detecting a movement or repositioning of the camera. In some embodiments, the camera initialization subunit 104D can communicate with a remote system (illustrated in FIG. 2) to initialize a camera with one or more camera parameters (e.g., camera height, camera viewing angle, and road plane normal). In other embodiments, the camera initialization subunit 104D can store one or more predictive models (e.g., as depicted in FIGS. 3A and 3B) to generate camera parameters locally. In some embodiments, a combination of approaches can be employed. For example, the camera initialization subunit 104D can locally predict camera parameters and then confirm these parameters with a remote system. Alternatively, in an embodiment, the camera initialization subunit 104D can predict a horizon line and transmit the horizon line along with lane key points to a remote system to determine camera parameters.

As will be discussed in more detail, some embodiments of the disclosure are related to lane detection in the above vehicular system. The disclosed embodiments generalize lane boundary (line or curve) detection on a rather small dataset as compared to lane region analysis which requires larger data sets. The disclosed embodiments utilize a convolutional neural network (CNN) to predict lane boundary and horizon markers directly instead of sampling them from segmentation maps. The CNN output is then passed through a post-processing pipeline to fit lines to the predicted markers generated by the CNN and to initialize lane width. At inference, if the disclosed embodiments fit two lane boundaries (e.g., lines or curves) to the detected markers jointly using the initialized lane width within a reasonable tolerance (e.g., 30%) and parallelism, the disclosed embodiments may then predict any missing lane boundaries and handle multiple predictions through weighted averaging. The disclosed embodiments greatly improve the lane detection accuracy when compared to existing systems.

Figure 2:
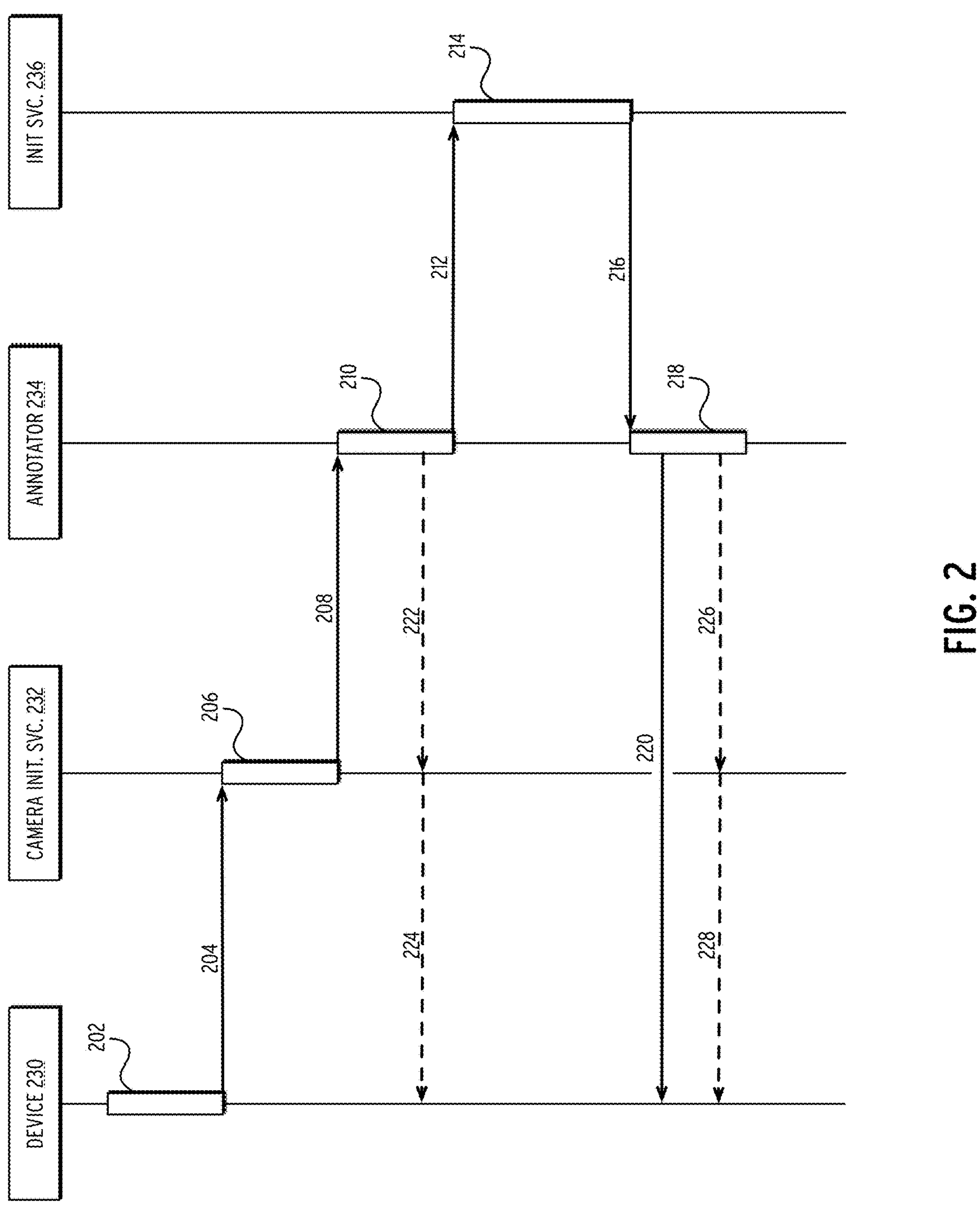
FIG. 2 is an interaction diagram illustrating a method for initializing a camera according to some embodiments.
Figure 3A:
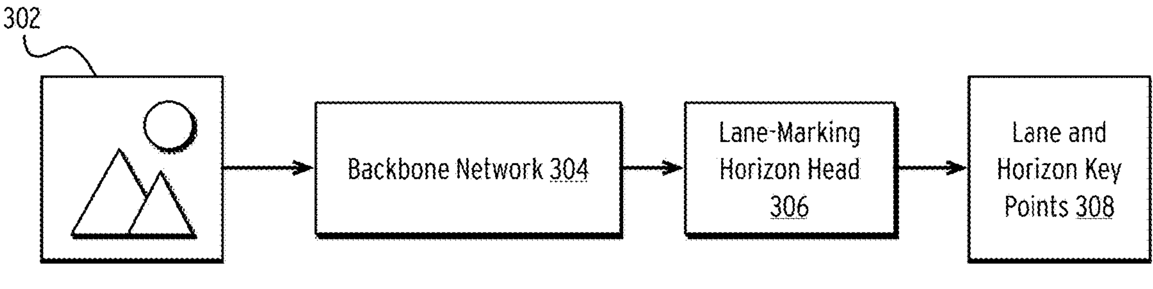
FIG. 3A is a block diagram illustrating a neural network for predicting lane and horizon lines according to some embodiments.
Figure 3B:
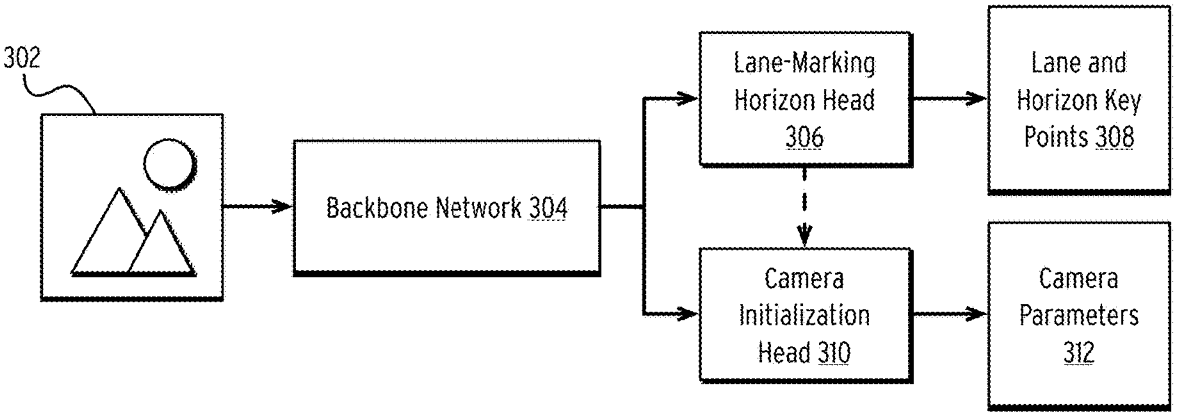
FIG. 3B is a block diagram illustrating a neural network for predicting lane and horizon lines and camera parameters according to some embodiments.

FIG. 2 is a swim lane diagram illustrating a method for initializing a camera according to some embodiments.

In process 202, a device 230 (e.g., a camera and processor installed in a vehicle) captures a video, represented as, for example, a set of one or more images. In an embodiment, process 202 can include capturing a sequence of frames. In an embodiment, the device 230 can trigger process 202 when a vehicle equipped with the device 230 is in a preferred location, such as traveling on a highway. In such an embodiment, process 202 can comprise determining the location of a vehicle and confirming that the location is near a highway or other predefined location type. In an embodiment, the device 230 can implement process 202 as a state machine executing on the device 230 that continuously monitors for a special event. Examples of special events include driving over a preset speed (e.g., 35 miles per hour) for a preset duration (e.g., sixty seconds). Once this special event is detected, process 202 can then begin capturing images for a preset duration (e.g., thirty or sixty seconds). In an embodiment, process 202 can additionally confirm a road type (e.g., determining if the vehicle is on a highway or two-lane road) before recording images.

Once process 202 records a video of the preset duration, it transmits a camera initialization event to a camera initialization service 232 in transmission 204. In the illustrated embodiment, the camera initialization service 232 can comprise a remote computing device executing the camera initialization service 232. For example, the camera initialization service 232 can comprise an application running on a remote server.

In process 206, the camera initialization service 232 receives the video transmitted in transmission 204. In an embodiment, the camera initialization service 232 can comprise a remote endpoint configured to receive network requests and process the request body (i.e., the video). In an embodiment, the camera initialization service 232 detects lane and horizon lines in the video using a predictive model, such as a deep learning or other AI model. In an embodiment, process 206 can comprise inputting the video into a predictive model, such as a CNN or other type of deep learning model to identify lane and horizon markers in a given video file automatically. Details of this type of predictive model are provided in the description of FIG. 6 and are not repeated herein. Additionally, examples of such models are provided in FIGS. 3A and 3B. In general, the model can output a set of lane and horizon lines identified by key points or markers.

In one embodiment, if process 206 can detect at least two lanes (e.g., identified by three independent lane lines), process 206 can further include computing camera parameters for the device 230 that recorded the video. Further detail on computing camera properties based on detected lane lines is provided in commonly-owned application Ser. No. 17/173,950, filed Feb. 11, 2021, and incorporated by reference in its entirety. As one example, process 206 can predict the camera height, viewing angle, and road plane normal.

In an embodiment, process 206 overlays the computed lane and horizon lines on the original video file, generating an overlaid video file. An example of such an overlaid video file is provided in FIG. 3C. In some embodiments, the overlaying of lane lines can be optional. In another embodiment, process 206 can only overlay a horizon on the original video file as part of generating an overlaid video file. Process 206 can then transmit this overlaid video file to an annotator device 234 in transmission 208.

In an embodiment, if the camera initialization service 232 fails to estimate lane or horizon lines and thus does not compute camera parameters, the camera initialization service 232 can bypass generating an overlaid video file. In such a scenario, the camera initialization service 232 can transmit the original video file in transmission 208 to enable the annotator device 234 so that the annotator device 234 can add lane markings manually, as will be discussed.

In an embodiment, the annotator device 234 can comprise a workstation or web-based application allowing for human review of automatically detected horizon and lane lines. When the annotator device 234 receives an overlaid video file, process 210 presents the overlaid video file to the human annotator. The process 210 then requests that the human annotator confirm the lane lines (if present) and horizon in the overlaid video file. If the annotator confirms the overlaid lines, the annotator can accept the lines and transmit its acceptance back to the camera initialization service 232 in transmission 222. In response, the camera initialization service 232 can then transmit the generated camera parameters back to the device 230 in transmission 224. As described in, for example, FIG. 6, the device 230 can then use these parameters to perform lane detection and distance estimation, respectively, while a camera is in motion.

As discussed, if the annotator device 234 receives the original video file and not an overlaid video file, the annotator device 234 may manually mark lane markers and thus lane lines using an annotation interface allowing for graphical entry of lane markers and (optionally) horizons on the images in the original video file. For example, the annotator interface may allow for manual drawing of lines (e.g., via straight lines or Bezier curves) overlaid on an image in a video file. These manual entries can then be converted into lane lines of the same format output by the deep learning model of the camera initialization service 232. In an embodiment, if the annotator device 234 received an overlaid video file but determines that the overlaid lane lines or horizon is not accurate, the human annotator can manually annotate the lane lines and bypass the transmission 222. Thus, if the annotator device 234 receives an original video or receives an incorrectly labeled overlaid video file, the human annotator will manually add a horizon line and/or lane lines in process 210.

In the illustrated embodiment, if process 210 transmits an acceptance in transmission 222, the method ends after transmission 224. However, if process 210 determines that no lane lines were added by process 206 or that the added lane lines were inaccurate, the human annotator manually adds such lines, generating a second, manually overlaid video file, and transmits the manually overlaid video file to the initialization service 236 in transmission 212.

In the illustrated embodiment, the initialization service 236 executes a process 214 in response to a video file and lane line markers. In an embodiment, process 214 can comprise a deep learning or AI model that predicts camera parameters (e.g., height, IPM, etc.) based on such input data. Certainly, in some embodiments, camera initialization service 232 may employ dual models: one predicting lane lines and one predicting camera parameters based on lane lines. In such an embodiment, the initialization service 236 can reuse the model for predicting camera parameters. In some embodiments, these two models may comprise heads of a multi-headed model sharing a common backbone neural network. Details of such models are provided in FIGS. 3A and 3B.

After processing, process 214 returns a computed horizon line and camera parameters to the annotator device 234 in transmission 216. In one embodiment, the data in transmission 216 can comprise an overlaid video similar or identical to that transmitted in transmission 208. In response, the annotator device 234 performs process 218, which can be similar or identical to that of process 210. Specifically, the manually overlaid video file is reviewed by human reviewers to confirm the horizon line and/or camera parameters. If the annotator rejects the predicted horizon line and/or camera parameters, the annotator device 234 can request a new video capture by the device 230 by requesting one in transmission 220. Alternatively, if the annotator confirms that the horizon and/or camera parameters are accurate, the annotator device 234 can transmit the camera parameters to the camera initialization service 232 in transmission 226. The camera initialization service 232 can receive the camera parameters and, in some embodiments, can store the camera parameters as training data to improve the deep learning model. Further, the camera initialization service 232 can return the accepted camera parameters to the device 230 in transmission 228.

FIG. 3A is a block diagram illustrating a neural network for predicting lane and horizon lines according to some embodiments.

Systems can use the illustrated neural network in some embodiments instead of a geometric process to determine lane and horizon lines. Specifically, given an input image 302 (e.g., a video frame), a backbone network 304 can convolve the input image 302 to generate a set of intermediate features (not illustrated). The backbone network 304 feeds these intermediate features into a lane-horizon marking head 306, which outputs a plurality of key points 308 representing both the lane lines in the input image 302 as well as a horizon line in the input image 302.

In an embodiment, the lane-horizon marking head 306 can comprise a CNN configured to process images and output a sequence of points representing the horizon and/or lane lines. For example, in some embodiments, lane-horizon marking head 306 can be a fully convolutional network (FCN) that includes a plurality of convolutional blocks where each block can include one or more convolution, batch normalization, activation and up-sampling layers. In some embodiments, FCN can also be a network comprising, or based on, Unet, DeepLab, PSPNet, SCNN or EnetSAD architectures. In some embodiments, FCN can include a neck module that further processes backbone features to detect markers on fine-grain scale. The neck module can have one or more feature pyramid network (FPN), spatial pyramid pooling (SPP), recurrent neural network (RNN) or long short-term memory (LSTM) layers to take advantage of contextual information. In an embodiment, the lane-horizon marking head 306 can be a transformer network. In some embodiment, the lane-horizon marking head 306 can further include a plurality of fully connected layers (e.g., dense layers) with optional dropout layers that output predicted lane or horizon markers.

In some embodiments, the lane-horizon marking head 306 can comprise a combined deep learning network that predicts both horizon and lane lines. In another embodiment, lane-horizon marking head 306 can comprise two separate prediction heads (e.g., deep learning models). In such an embodiment, the losses of the two separate prediction heads can be combined as a joint loss function when backpropagating.

Figure 3C:
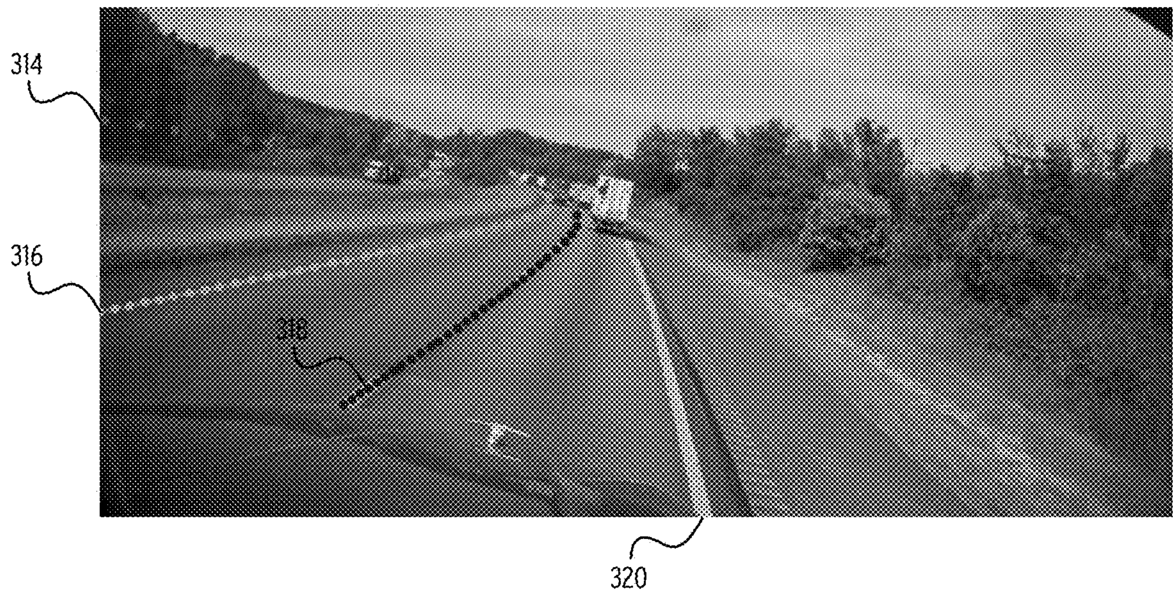
FIG. 3C is an illustration of the output of the neural networks of FIGS. 3A and 3B, according to some embodiments.

FIG. 3C illustrates the predicted lane/horizon lines overlaid on top of an input image. As illustrated, the neural network predicts both horizon line 314 and multiple lane lines (e.g., lane line 316, lane line 318, and lane line 320).

In some embodiments, the backbone network 304 can comprise an EfficientNet backbone network. For example, in some embodiments, the backbone network 304 can comprise an EfficientNet or EfficientNet-lite backbone. In an embodiment, the backbone network 304 can further comprise a plurality of convolutional layers followed by one or more LSTM layers. In some embodiments, a max-pooling layer can be inserted between the convolutional layers and the LSTM layers. In some embodiments, a fully connected layer can be placed after the LSTM layers to process the outputs of the LSTM layers. Alternatively, or in conjunction with the foregoing, the intermediate network can comprise an RNN. In other embodiments, the intermediate network can be implemented using Gated Recurrent Unit (GRU), bidirectional GRU, or transformer layers (versus LSTM or RNN layers).

In an embodiment, the neural network is trained to predict lane and horizon key points 308. During testing, image frames are fitted with lane lines and horizon lanes based on estimated key points. As described, in some embodiments, human annotators can be used to perform this fitting, as described in the description of FIG. 2. In other embodiments, a geometric process can be performed to identify lane and horizon lines. As discussed in previous figures, once the horizon line is determined, downstream processes can use the horizon line to determine the height of a camera and its viewing angle (i.e., road plane normal) with respect to the ground. Further, from these, downstream processes can determine the road-plane normal vector.

In some embodiments, by using a neural network, a camera device equipped with the neural network can more rapidly estimate a horizon line using a lightweight model locally installed on the camera device. As such, if the camera device is moved (either intentionally or unintentionally), the camera can automatically re-estimate the horizon lines and re-compute the camera parameters. In some embodiments, Kalman filtering can be employed to temporally smooth image and/or horizon/lane key points over time.

In some embodiments, the neural network can be employed in combination with the process depicted in FIG. 2. Specifically, the processing in FIG. 2 utilizes a remote computing system to annotate horizon and lane lines, and in some cases, manually adding lane markers. In some embodiments, a vehicular system can use the system of FIG. 3A and "fallback" to the procedure described in FIG. 2 in the event that the key points 308 cannot be accurately predicted using the system of FIG. 3A. In some embodiments, the model of FIG. 3A can provide advantages over the offline process of FIG. 2. For example, the use of the neural network can relax constraints that the vehicle needs to be driving on a highway having three or more lane lines. Indeed, just two lane-lines with a known lane-width would be sufficient for camera initialization. That is, since the model is capable of predicting the horizon line directly, previous requirements of having three lane lines in frame (e.g., to geometrically calculate a horizon line) can be relaxed. Additionally, the neural network can be configured to run directly on in-vehicle devices and does not require a cloud-based service initiation or annotator review. Further, since the camera itself can detect (or be informed of) movements, recalibration can be done on an as-needed basis.

FIG. 3B is a block diagram illustrating a neural network for predicting lane and horizon lines and camera parameters according to some embodiments.

In the illustrated embodiment, various elements have previously been discussed, such as input image 302, backbone network 304, lane-horizon marking head 306, and key points 308. The discussion of these components is not repeated herein but is incorporated by reference in its entirety.

In the illustrated embodiment, in addition to the component of the model of FIG. 3A, a separate camera parameter prediction head 310 that outputs camera parameters 312 is coupled to backbone network 304. Thus, the backbone network 304 feeds intermediate representations of input image 302 into the separate camera parameter prediction head 310, and the separate camera parameter prediction head 310 outputs corresponding camera parameters 312. In an embodiment, the camera parameters 312 can comprise a camera height and viewing angle with respect to the ground plane and the road-plane normal vector. In some embodiments, when the neural network of FIG. 3B is used, the lane-horizon marking head 306 can be modified to only predict lane lines and not a horizon line.

As with lane-horizon marking head 306, in some embodiments, the camera parameter prediction head 310 can include a plurality of convolutional blocks used to compute relationships among different objects in the scene. Each convolutional block can include, in some embodiments, one or more convolutional, batch normalization, activation or up-sampling layers. In an embodiment, the camera parameter prediction head 310 can further include a plurality of fully connected layers (e.g., dense layers) with optional dropouts to predict camera parameters. The specific arrangement of layers in the camera parameter prediction head 310 is not limiting, and other configurations may be used.

In the illustrated embodiment, the separate camera parameter prediction head 310 can predict camera parameters 312 without relying on the key points 308. Specifically, while the two heads are trained simultaneously (using a joint loss function), the individual heads can be separated and used independently. Thus, backpropagation based on the joint loss can utilize relevant features of backbone network 304 and lane-horizon marking head 306 to optimize the layers of the separate camera parameter prediction head 310. Then, in production, the input image 302 can be fed through the backbone network 304 and separate camera parameter prediction head 310 to predict camera parameters such as camera height and viewing angle.

In an embodiment, the output of the lane-horizon marking head 306 can further be used as an input to separate camera parameter prediction head 310. In such an embodiment, the key points 308 can be used as an additional feature (along with image representations) to predict the camera parameters. In some embodiments, this additional input may be optional.

In some embodiments, a joint loss is minimized, which comprises the aggregate of the loss of the lane-horizon marking head 306 ($loss_{lane\text{-}horizon}$) that evaluates the distance between the estimated and ground-truth lane/horizon key points and the loss of the separate camera parameter prediction head 310 ($loss_{cam\text{-}init}$) that comprises the loss between the estimated and ground-truth camera parameters. Thus, the joint loss minimized is equal to $loss_{joint}=loss_{lane\text{-}horizon}+loss_{cam\text{-}init}$.

In some embodiments, the neural network of FIG. 3B can provide additional advantages over current systems. For example, the neural network can directly estimate camera parameters and partially or completely eliminate the need for accurate lane and horizon detection. In addition, the illustrated neural network does not require the lane width of the road the vehicle is running on. In some embodiments, the estimation of an auxiliary horizon can also be used in formulating a fusion strategy among different methods of camera initialization (manual, geometry-based and model-based).

Figure 4A:
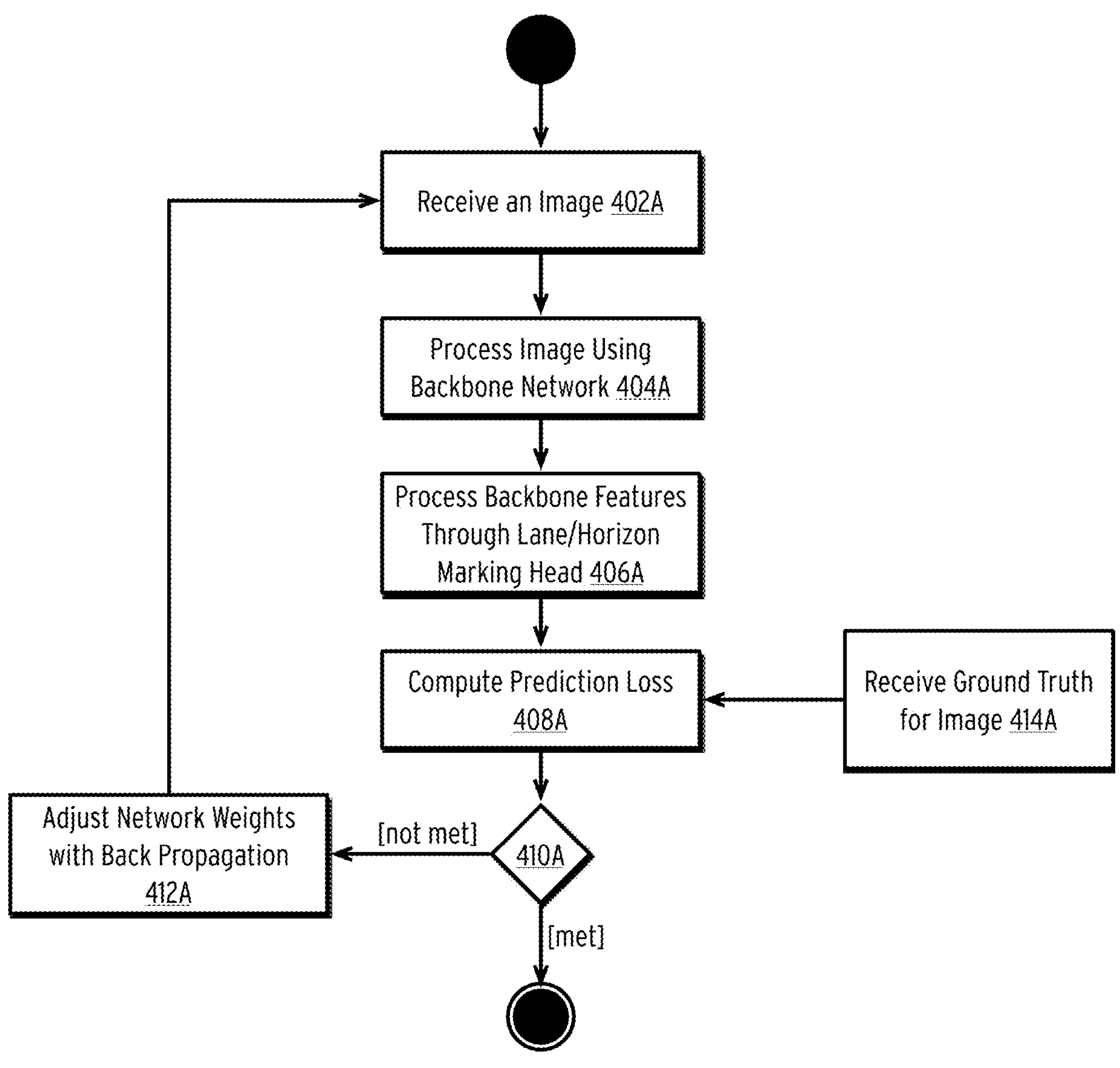
FIG. 4A is a flow diagram illustrating a method for training the neural network of FIG. 3A according to some embodiments.

FIG. 4A is a flow diagram illustrating a method for training the neural network of FIG. 3A according to some embodiments.

In step 402A, the method receives an image or set of images. In one embodiment, the image in the method comprises an image captured by a camera device installed within a vehicle. Such images were discussed previously in connection with FIG. 3A, the disclosure of which is incorporated in its entirety. In some embodiments, a set of images can be received as a batch of images. In some embodiments, the image or set of images can comprise a video or video frames.

In step 404A, the method processes the image(s) using a backbone network. In an embodiment, the backbone network can comprise a backbone network such as backbone network 304, the disclosure of which is incorporated in its entirety. In some embodiments, the backbone network can include an intermediate network as discussed in the description of FIG. 3A.

In step 406A, the method inputs the features of the backbone network (and, if implemented, an intermediate network) into a lane/horizon marking head. As described in FIG. 3A, the lane/horizon marking head can comprise a neural network configured to predict lane and/or horizon markers for a given image or set of images. In some embodiments, the lane/horizon marking head can include an RNN or LSTM layer (or layers) to refine predictions based on a sequence of images.

In step 408A, the method takes input, from step 414A, the ground truth image labels corresponding to the processed image along with all the classification prediction head's output to compute a prediction loss. Details of prediction loss and backpropagation are described in the previous FIG. 3A and are not repeated herein but are incorporated in their entirety herein. In general, the ground truth can comprise a set of expected markers or lines (e.g., horizon and/or lane markers or lines). In step 408A, the method computes the loss for each of the lane and/or horizon markers as compared to the predicted lane and/or horizon markers to determine a prediction loss.

In step 410A, the method determines if a stopping criterion is met. If so, the method ends. In one embodiment, the stopping criterion can comprise a configurable parameter set during the training of the machine learning (ML) model. In one embodiment, the stopping criterion can comprise a monitored performance metric such as the output of the loss function. Other types of stopping criteria can be utilized alone or in combination with the foregoing. For example, one stopping criterion may comprise the lack of a change in the loss function output across a configured number of epochs, a decrease in performance of the ML model, or a cap on the maximum number of allowed epochs or iterations.

In step 412A, if the method determines that the stopping criterion is not met, the method will compute partial derivatives against all trainable network parameters and back-propagates them to adjust each layer parameter, as described previously.

In brief, in steps 402A-412A, the method can repeatedly adjust the parameters in the network so as to minimize a measure of the difference (e.g., cost function) between the predicted output of the ML model and the ground truth until the stopping criterion is met. In the illustrated embodiment, if the method returns to step 402A after step 412A, the method will utilize the weights updated in step 412A. Alternatively, when the method determines that a stopping criterion is met, the method may end.

Figure 4B:
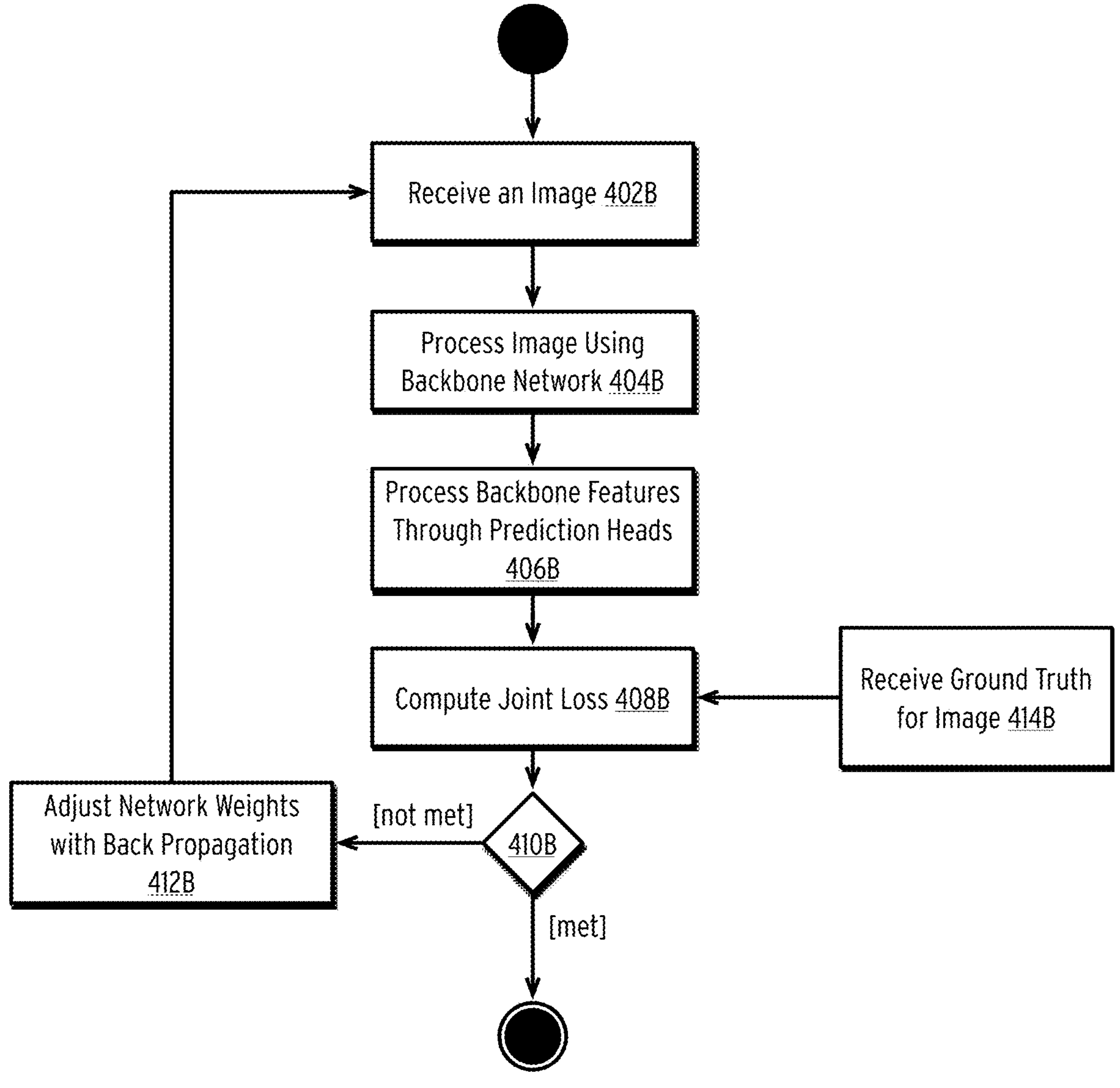
FIG. 4B is a flow diagram illustrating a method for training the neural network of FIG. 3B according to some embodiments.

FIG. 4B is a flow diagram illustrating a method for training the neural network of FIG. 3B according to some embodiments.

In step 402B, the method receives an image. In one embodiment, the image in the method comprises an image captured by a camera device installed within a vehicle. Such images were discussed previously in connection with FIG. 3B, the disclosure of which is incorporated in its entirety. In some embodiments, a set of images can be received as a batch of images. In some embodiments, the image or set of images can comprise a video or video frames.

In step 404B, the method processes the image using a backbone network. In an embodiment, the backbone network can comprise a backbone network such as backbone network 304, the disclosure of which is incorporated in its entirety.

In step 406B, the method feeds backbone features into a plurality of prediction heads. In various embodiments, the prediction heads can include multiple prediction heads as depicted in FIG. 3B. Specifically, in an embodiment, the prediction heads include a first prediction head configured to predict lane and/or horizon lines/markers and a second prediction head configured to predict camera parameters (e.g., a height, angle with respect to a roadway, and road plane normal). In some embodiments, the method can optionally process the backbone features using an intermediate head (e.g., an intermediate network such a CNN, RNN, LSTM, GRU, etc.) prior to inputting data into the prediction heads. The specific processing of each of the prediction heads has been described previously in the descriptions of FIG. 3B and is not repeated herein but is incorporated herein in its entirety.

In step 408B, the method takes as input, from step 414B, the ground truth image labels corresponding to the processed image along with all the prediction heads' outputs to compute a single joint loss aggregating the individual losses of the plurality of prediction heads. Details of joint loss function and backpropagation are described in the previous FIG. 3B and are not repeated herein but are incorporated in their entirety herein. In general, the ground truth can comprise a set of expected markers or lines (e.g., horizon and/or lane markers or lines) as well as expected camera parameters. In step 408B, the method computes the loss for each of the expected features as compared to the predicted features and aggregates these losses to determine a joint loss.

In step 410B, the method determines if a stopping criterion is met. In one embodiment, the stopping criterion can comprise a configurable parameter set during the training of the ML model. In one embodiment, the stopping criterion can comprise a monitored performance metric such as the output of the loss function. Other types of stopping criteria can be utilized alone or in combination with the foregoing. For example, one stopping criterion may comprise the lack of a change in the loss function output across a configured number of epochs, a decrease in performance of the ML model, or a cap on the maximum number of allowed epochs or iterations.

In step 412B, if the method determines that the stopping criterion is not met, the method computes partial derivatives against all trainable network parameters and back-propagates them to adjust each layer parameter, as described previously.

In brief, in steps 402B-412B, the method can repeatedly adjust the parameters in the network so as to minimize a measure of the difference (e.g., cost function) between the predicted output of the ML model and the ground truth until the stopping criterion is met. Alternatively, when the method determines that a stopping criterion is met, the method may end. In the illustrated embodiment, if the method returns to step 402B after the decision in step 410B, the method will utilize the weights updated in step 412B.

Figure 5A:
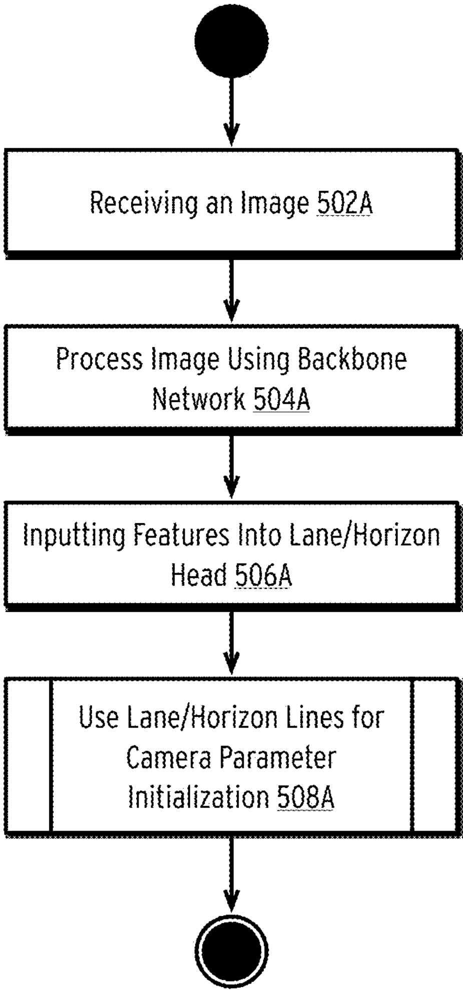
FIG. 5A is a flow diagram illustrating a method for predicting lane and horizon lines using the neural network of FIG. 3A according to some embodiments.

FIG. 5A is a flow diagram illustrating a method for predicting lane and horizon lines using the neural network of FIG. 3A according to some embodiments. As will be discussed, in some embodiments, FIG. 5A can be used as part of step 608.

In step 502A, the method receives an image or set of images. In one embodiment, the image in the method comprises an image captured by a camera device installed within a vehicle. Such images were discussed previously in connection with FIG. 3A, the disclosure of which is incorporated in its entirety. In some embodiments, a set of images can be received as a batch of images. In some embodiments, the image or set of images can comprise a video or video frames.

In step 504A, the method processes the image(s) using a backbone network. In an embodiment, the backbone network can comprise a backbone network such as backbone network 304, the disclosure of which is incorporated in its entirety. In some embodiments, the backbone network can include an intermediate network.

In step 506A, the method inputs the features of the backbone network (and, if implemented, an intermediate network) into a lane and/or horizon prediction head. In some embodiments, the lane and/or horizon prediction head can comprise lane-horizon marking head 306, the disclosure of which is incorporated in its entirety.

In step 508A, the method uses the predicted lane and/or horizon markers or lines to compute camera parameters. Details of this step are provided in more detail in the description of FIG. 7, incorporated herein in its entirety.

Figure 5B:
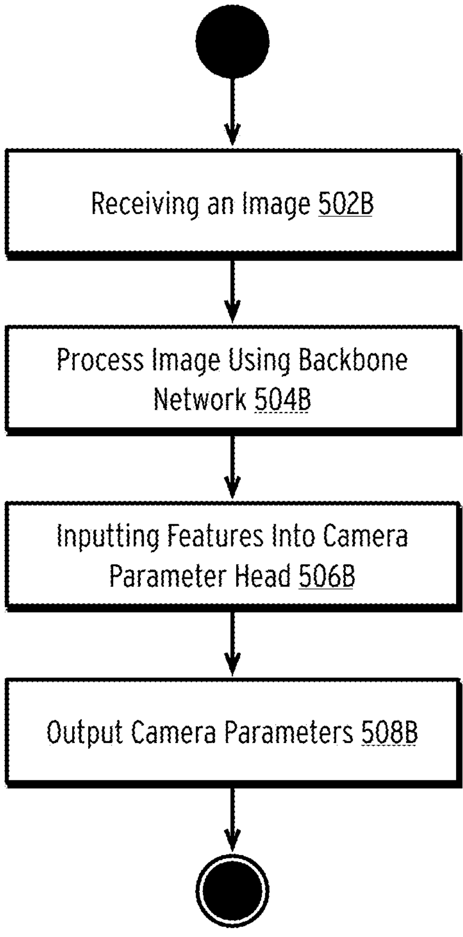
FIG. 5B is a flow diagram illustrating a method for predicting lane and horizon lines and camera parameters using the neural network of FIG. 3B according to some embodiments.

FIG. 5B is a flow diagram illustrating a method for predicting lane and horizon lines and camera parameters the neural network of FIG. 3B according to some embodiments. As will be discussed, in some embodiments, FIG. 5B can be used as part of step 608.

In step 502B, the method receives an image or set of images. In one embodiment, the image in the method comprises an image captured by a camera device installed within a vehicle. Such images were discussed previously in connection with FIG. 3B, the disclosure of which is incorporated in its entirety. In some embodiments, a set of images can be received as a batch of images. In some embodiments, the image or set of images can comprise a video or video frames.

In step 504B, the method processes the image(s) using a backbone network. In an embodiment, the backbone network can comprise a backbone network such as backbone network 304, the disclosure of which is incorporated in its entirety. In some embodiments, the backbone network can include an intermediate network.

In step 506B, the method inputs the features of the backbone network (and, if implemented, an intermediate network) into a camera parameter head. In an embodiment, the camera parameter head can comprise separate camera parameter prediction head 310. In an optional embodiment, the method can further input the features of the backbone network into a lane and/or horizon prediction head. In some embodiments, the lane and/or horizon prediction head can comprise lane-horizon marking head 306, the disclosure of which is incorporated in its entirety.

In step 508B, the method outputs camera parameters. In some embodiments, the camera parameters can be stored for future use, such as during lane detection or distance estimation as described in FIG. 6. If the method predicts lane or horizon markers/lines, step 508B can further comprise outputting the predicted lane/horizon markers/lines.

Figure 6:
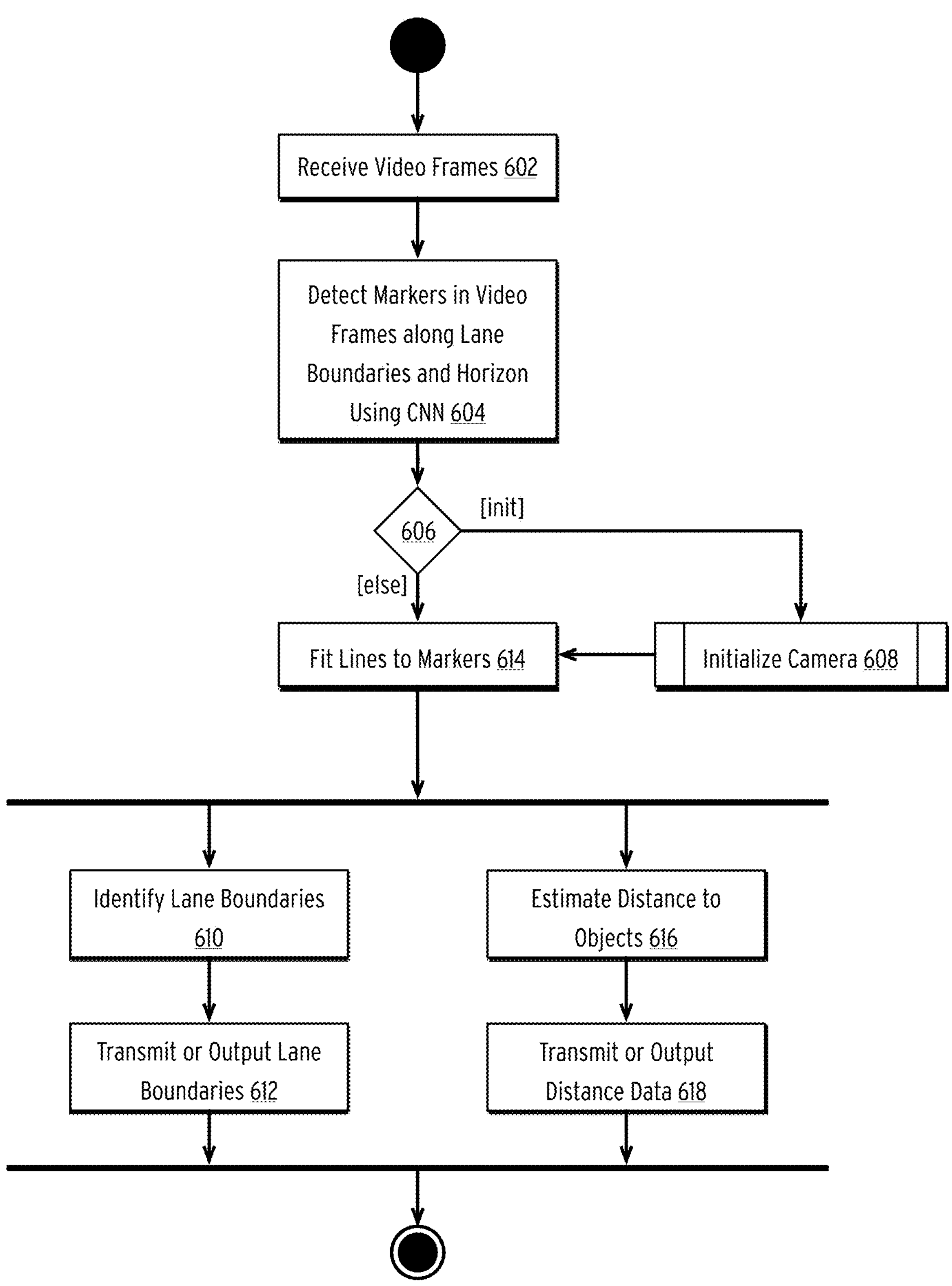
FIG. 6 is a flow diagram illustrating a method for detecting lane markers on a roadway and determining distances to objects according to some embodiments.

FIG. 6 is a flow diagram illustrating a method for detecting lane markers on a roadway and determining distances to objects according to some embodiments of the disclosure.

In step 602, the method receives video frames. In an embodiment, the video frames are captured by a camera installed in or on a vehicle. In an embodiment, the camera is mounted at a fixed location and direction with respect to the vehicle. For example, the camera may be a dash-mounted camera. In an embodiment, the camera continuously streams video frames while in operation.

Figure 7:
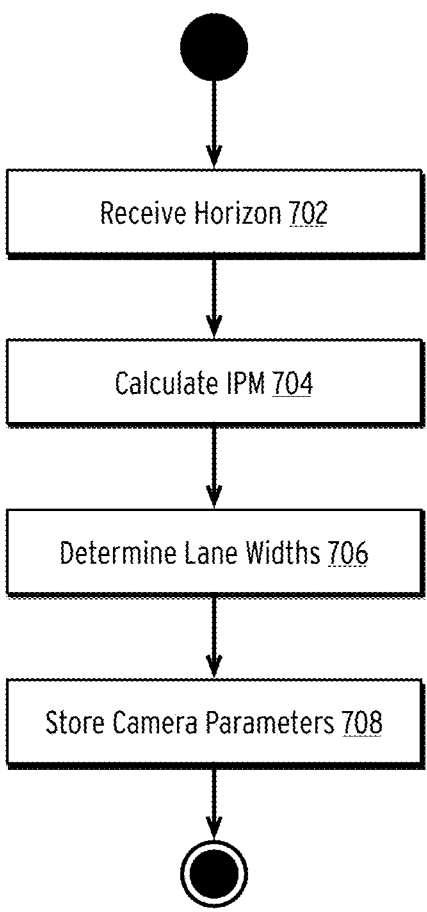
FIG. 7 is a flow diagram illustrating a method for initializing a camera installed in a vehicle according to some embodiments.

In step 604, the method detects markers (or key points) in video frames using a CNN. Reference is made to FIG. 7, which depicts one embodiment of a CNN used in step 604, according to some embodiments of the disclosure. In an alternative embodiment, the network of FIG. 3A or 3B can alternatively be used to predict lane lines. For example, key points 308 can be used to generate horizon line key points using lane-horizon marking head 306. In such an embodiment, the lane-horizon marking head 306 can be utilized both for initialization (as will be discussed) but also during the prediction phase (e.g., to continuously identify a horizon line).

In step 606, the method determines if the system is initializing a camera. If so, the method proceeds to step 608. If not, the method proceeds to step 610. Next, in step 614, the method fits one or more lines to the markers. In some embodiments, step 614 can be optional. As illustrated, if the camera is already initialized, step 608 is bypassed, and the method proceeds directly toward step 614. In an alternative embodiment, as exemplified in FIG. 2, step 606 can be executed after step 602 and step 608 can include the network-based initialization procedure described in FIG. 2.

In an embodiment, the method determines that the system is initializing if camera parameters have not been stored for the camera. In an embodiment, the estimation of camera parameters is a one-off calculation for a given camera which is done over a small set of initial frames. Thus, each camera can be associated with a set of camera parameters and these camera parameters need only be calculated once per camera. In some embodiments, the camera parameters may be recalculated as desired or in response to a change in camera position or other intrinsic value. For example, in an embodiment, the method can determine if an orientation measured by one or more leveling devices has changed from an orientation that was present when calculating the camera parameters. If so, the method can perform step 608 in response to detecting such a change. In one embodiment, the camera parameters can comprise a camera height and road normal vector associated with a given camera. In some embodiments, an inverse perspective mapping can then be computed based on the camera height and road normal vector.

In step 608, the method initializes the camera using the frames recorded by the camera.

In an embodiment, camera initialization involves using the horizon output by a CNN (e.g., using the methods described in FIG. 2, 5A, or 5B) and third-party data sources to calculate a camera height and road normal vector. In some embodiments, after identifying a camera height and road normal vector, the method can further comprise calculating an IPM that can be used to synthetically rotate the viewpoint of the video frames. In some embodiments, the method can then use a lane width determined from the rotated viewpoint to fit equidistant parallel lanes in rectified view after the initialization.

In an embodiment, the methods discussed in connection with FIG. 6 may utilize horizon detection directly from lane detection network as a fifth line (in addition to four lane lines). In some embodiments, a separate neural network for horizon detection may also be used. Details of this approach are described in connection with FIGS. 3A and 3B. As an alternative, a server-side approach can be used to determine the camera parameters. Details of this approach are described in connection with FIG. 2.

FIG. 7 is a flow diagram illustrating a method for initializing a camera installed in a vehicle according to some embodiments of the disclosure. As described above, the method may only need be performed once per camera or can be performed on demand (e.g., in response to a change in camera orientation or angle) as part of a recalibration or reinitialization procedure.

In step 702, the method receives a horizon line detected using a CNN or similar model. As discussed above, in some embodiments, the horizon line can be determined by a local neural network (as in FIGS. 3A and 3B) or via a remote data source (as in FIG. 2).

In step 704, the method computes the IPM for a camera and rectifies the sample images. In an embodiment, step 704 comprises computing a road plane normal vector ($\hat{n}$) using an intrinsic camera matrix (K) and the detected horizon ($l_n$) according to:

$$\hat{n} = K^T l_h \quad \text{(Equation 1)}$$

where $K^T$ comprises the transpose of the intrinsic camera matrix. In an embodiment, the intrinsic camera matrix comprises the geometric properties of the camera. After computing the plane normal ($\hat{n}$), the method computes the IPM (H) using:

$$H = KRK^{-1} \quad \text{(Equation 2)}$$

where H is the rectification homography which will rotate the camera view to align its Z-axis with the road plane normal, and R is the rotation matrix defined by:

$$R = [l_h \times \hat{n}; (l_h \times \hat{n}) \times -\hat{n}; -\hat{n}] \quad \text{(Equation 3)}$$

Further detail on computing an IPM is provided in commonly-owned application Ser. No. 17/173,950, filed Feb. 11, 2021, and incorporated by reference in its entirety.

In some embodiments, the method may further include step 706 wherein lane widths (in pixels) of lanes in the video frames are determined.

In an embodiment, a current location is determined in step 706. As used herein, a current location can refer to a latitude and longitude, Geohash value, or other identifying value. In an embodiment, this current location is used to retrieve lane width details from a third-party mapping service. In an embodiment, the method can transmit the current location to the third-party mapping service and receive a lane width associated with the current location or, more specifically, the roadway present at the current location. If the third-party mapping service returns such data, the method can set the value of the lane width in pixels ($L_{W_p}$) to the return value.

In other embodiments, the third-party mapping service may not return a lane width. In such an embodiment, the third-party mapping service may provide a bird's eye image of the roadway at the current location and a resolution. In an embodiment, the resolution can comprise a unit of measurement converting pixels to physical distances. Thus, as one example, one pixel may correspond to one foot. In such an embodiment, the method can automatically identify lane lines within the image (e.g., using a CNN or other machine learning approach) and then compute the number of pixels between each lane line. The method can then convert the lane width in pixels ($L_{W_p}$) to a real-world lane width distance ($L_{W_r}$) using the returned resolution.

In an alternative embodiment, the method can rely on user input to detect lane widths. In such an embodiment, the method can display the images returned from the third-party mapping service and display the image to a user. The user can then manually identify lane lines (e.g., by using a line drawing tool, touch screen, etc.). The method can then use the user markup to compute the distance between lane lines and compute the number of pixels between each lane line. The method can then convert the number of pixels to a real-world lane width distance ($L_{W_r}$) using the returned resolution.

In another embodiment, the method can attempt to automatically mark lane lines using, for example, a machine learning model. The method can then display the predicted lane lines to the user to allow the user to confirm, reject, and/or adjust the predicted markers. The method can then compute the number of pixels between each lane line. The method can then convert the number of pixels to a real-world lane width distance ($L_{W_r}$) using the returned resolution. Details of using a machine learning model to predict lane lines and/or horizon lines are described in the descriptions of FIGS. 2, 3A, 3C, and 3B.

In some embodiments, the result of the foregoing embodiments can be inconclusive. For example, image quality of the returned third-party service images may be unsuitable for annotation of lane lines and thus the lane widths are not able to be calculated. In such an embodiment, the method can revert to a geometric algorithm to determine a lane width, as detailed in commonly-owned application Ser. No. 17/173,950, filed Feb. 11, 2021.

In step 708, the method stores the camera parameters. In one embodiment, step 708 comprises storing the camera height, horizon line, and road plane normal. In some embodiments, step 708 can optionally comprise storing the IPM (H) and the lane width ($L_{W_p}$). In an embodiment, the camera parameters are stored in a non-volatile storage device and are associated with a camera. Thus, the camera parameters may be reused during subsequent operations performed on images captured by a given camera, as discussed fully in step 610. In some embodiments, the method may be executed directly on the camera and stored on the camera (such as on the edge hardware onboard the vehicle). In other embodiments, the value of H, lane width and camera height may be calculated off-camera and stored off-camera (such as in the cloud and stored in a cloud database).

Returning to FIG. 6, if the method determines that the camera is initialized, the method proceeds to apply the IPM to line or curves represented by the CNN-predicted markers and horizon to identify lane lines in a given frame. As illustrated, in some embodiments, the method may execute step 610 on the sample frames used to initialize the camera in step 608 as well. Details of applying an IPM to a set of image frames to detect lane lines are provided in more detail in commonly-owned application Ser. No. 17/173,950, filed Feb. 11, 2021 In step 612, the method transmits or outputs the perspective lane boundaries in step 612. In an embodiment, the method may transmit the line/curve data to a downstream processing device for further processing. For example, the method may transmit the data to a lane warning system to enable the system to determine if the vehicle crosses a lane boundary. In other embodiments, the outputting of the line or curve comprises displaying the line or curve on an in-vehicle display (e.g., a dash-mounted display or mobile phone). In an embodiment, the lane boundaries may be overlaid on top of the capture video frames.

In step 616, the method can additionally detect a distance to identified objects. As illustrated, steps 616 and 618 can be done in parallel with steps 610 and 612. Further, in some embodiments, steps 610 and 616 can be triggered asynchronously.

As illustrated, in some embodiments, the method may execute step 616 on the sample frames used to initialize the camera in step 608 as well. In an embodiment, any type of object detection system may be used to identify objects (e.g., via bounding boxes) within an image including detecting objects using DL object detectors such as Faster-RCNN, MobileNet-SSD, EfficientDets, YoloV1, YoloV2, YoloV3, YoloV4, YoloV5, and similar such systems. Details of detecting object distances in step 608 were described in commonly-owned application Ser. No. 17/173,950, filed Feb. 11, 2021. Finally, in step 616, the method transmits or outputs the distance data. In an embodiment, the distance data includes distances to detected objects. In some embodiments, the distance data includes bounding boxes for the detected objects. In some embodiments, the method may further detect lane boundary or lane lines/curves and may include these in the returned data. In an embodiment, the method may transmit the line/curve data to a downstream processing device for further processing. For example, the method may transmit the data to a collision detection system to enable the system to determine if the vehicle is too close to another object or vehicle.

Figure 8:
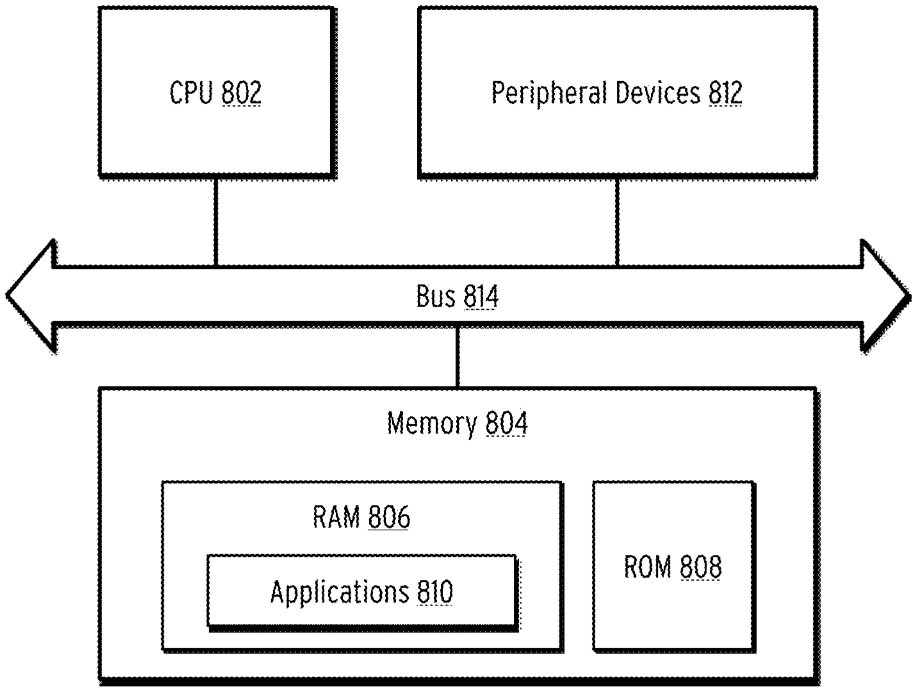
FIG. 8 is a block diagram illustrating a computing device showing an example embodiment of a computing device used in the various embodiments.

FIG. 8 is a block diagram of a computing device according to some embodiments of the disclosure. In some embodiments, the computing device can be used to train and use the various ML models described previously.

As illustrated, the device includes a processor or central processing unit (CPU) such as CPU 802 in communication with a memory 804 via a bus 814. The device also includes one or more input/output (I/O) or peripheral devices 812. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 802 may comprise a general-purpose CPU. The CPU 802 may comprise a single-core or multiple-core CPU. The CPU 802 may comprise a system-on-a-chip (SoC) or a similar embedded system. In some embodiments, a graphics processing unit (GPU) may be used in place of, or in combination with, a CPU 802. Memory 804 may comprise a memory system including a dynamic random-access memory (DRAM), static random-access memory (SRAM), Flash (e.g., NAND Flash), or combinations thereof. In one embodiment, the bus 814 may comprise a Peripheral Component Interconnect Express (PCIe) bus. In some embodiments, the bus 814 may comprise multiple busses instead of a single bus.

Memory 804 illustrates an example of computer storage media for the storage of information such as computer-readable instructions, data structures, program modules, or other data. Memory 804 can store a basic input/output system (BIOS) in read-only memory (ROM), such as ROM 808 for controlling the low-level operation of the device. The memory can also store an operating system in random-access memory (RAM) for controlling the operation of the device Applications 810 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 806 by CPU 802. CPU 802 may then read the software or data from RAM 806, process them, and store them in RAM 806 again.

The device may optionally communicate with a base station (not shown) or directly with another computing device. One or more network interfaces in peripheral devices 812 are sometimes referred to as a transceiver, transceiving device, or network interface card (NIC).

An audio interface in peripheral devices 812 produces and receives audio signals such as the sound of a human voice. For example, an audio interface may be coupled to a speaker and microphone (not shown) to enable telecommunication with others or generate an audio acknowledgment for some action. Displays in peripheral devices 812 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 812 may comprise any input device arranged to receive input from a user. An illuminator in peripheral devices 812 may provide a status indication or provide light. The device can also comprise an input/output interface in peripheral devices 812 for communication with external devices, using communication technologies, such as USB, infrared, Bluetooth™, or the like. A haptic interface in peripheral devices 812 provides tactile feedback to a user of the client device.

A GPS receiver in peripheral devices 812 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 8, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer readable medium (or computer-readable storage medium) stores computer data, which data can include computer program code or instructions that are executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, a myriad or software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

monitoring, by a camera device installed in a vehicle, for occurrence of a triggering event;

in response to detecting the triggering event, initiating an automatic camera calibration process, wherein the triggering event comprises maintaining a threshold speed for a predetermined duration;

determining, as part of the automatic camera calibration process, a vanishing point and a camera height;

storing the vanishing point and camera height as camera calibration parameters;

periodically re-executing the automatic camera calibration process to update the camera calibration parameters; and using the camera calibration parameters to detect events involving the vehicle.

2. The method of claim 1, wherein re-executing the automatic camera calibration process occurs at predetermined time intervals.

3. The method of claim 1, further comprising providing a manual calibration interface for setting the vanishing point.

4. The method of claim 1, further comprising generating an alert when an event is detected prior to completion of the automatic camera calibration process.

5. The method of claim 1, wherein the automatic camera calibration process comprises determining a road plane normal vector.

6. The method of claim 1, further comprising using the camera calibration parameters to determine distances to detected objects.

7. A non-transitory computer-readable storage medium for tangibly storing computer program instructions capable of being executed by a computer processor, the computer program instructions defining steps of:

monitoring, by a camera device installed in a vehicle, for occurrence of a triggering event;

in response to detecting the triggering event, initiating an automatic camera calibration process, wherein the triggering event comprises maintaining a threshold speed for a predetermined duration;

determining, as part of the automatic camera calibration process, a vanishing point and a camera height;

storing the vanishing point and camera height as camera calibration parameters;

periodically re-executing the automatic camera calibration process to update the camera calibration parameters; and using the camera calibration parameters to detect events involving the vehicle.

8. The non-transitory computer-readable storage medium of claim 7, wherein re-executing the automatic camera calibration process occurs at predetermined time intervals.

9. The non-transitory computer-readable storage medium of claim 7, the steps further comprising providing a manual calibration interface for setting the vanishing point.

10. The non-transitory computer-readable storage medium of claim 7, the steps further comprising generating an alert when an event is detected prior to completion of the automatic camera calibration process.

11. The non-transitory computer-readable storage medium of claim 7, wherein the automatic camera calibration process comprises determining a road plane normal vector.

12. The non-transitory computer-readable storage medium of claim 7, the steps further comprising using the camera calibration parameters to determine distances to detected objects.

13. A device comprising:

a camera;

a processor; and a memory storing computer program instructions that, when executed by a processor, cause the processor to perform steps of:

monitoring for occurrence of a triggering event;

in response to detecting the triggering event, initiating an automatic camera calibration process using the camera, wherein the triggering event comprises maintaining a threshold speed for a predetermined duration;

determining, as part of the automatic camera calibration process, a vanishing point and a camera height;

storing the vanishing point and camera height as camera calibration parameters;

periodically re-executing the automatic camera calibration process to update the camera calibration parameters; and using the camera calibration parameters to detect events involving the vehicle.

14. The device of claim 13, wherein re-executing the automatic camera calibration process occurs at predetermined time intervals.

15. The device of claim 13, the steps further comprising providing a manual calibration interface for setting the vanishing point.

16. The device of claim 13, the steps further comprising generating an alert when an event is detected prior to completion of the automatic camera calibration process.

17. The device of claim 13, wherein the automatic camera calibration process comprises determining a road plane normal vector.

18. The device of claim 13, the steps further comprising using the camera calibration parameters to determine distances to detected objects.

* * * * *